Inventor
Sidney T. Carter

Sept. 3, 1957 S. T. CARTER 2,804,961
CONVEYOR APPARATUS FOR ARTICLE-PROCESSING UNITS
Filed March 16, 1954 9 Sheets-Sheet 4

INVENTOR.
Sidney T. Carter
BY
Att'ys.

Sept. 3, 1957 S. T. CARTER 2,804,961
CONVEYOR APPARATUS FOR ARTICLE-PROCESSING UNITS
Filed March 16, 1954 9 Sheets-Sheet 5

INVENTOR.
Sidney T. Carter
BY
Att'ys.

Sept. 3, 1957  S. T. CARTER  2,804,961
CONVEYOR APPARATUS FOR ARTICLE-PROCESSING UNITS
Filed March 16, 1954  9 Sheets-Sheet 6

Fig. 9

Inventor
Sidney T. Carter
by Roberts Cushman & Grover
Att'ys.

INVENTOR.
Sidney T. Carter
BY
Att'ys.

Inventor
Sidney T. Carter
by *[signature]*
Att'ys.

2,804,961

CONVEYOR APPARATUS FOR ARTICLE-PROCESSING UNITS

Sidney T. Carter, Shrewsbury, Mass., assignor to Geo. J. Meyer Manufacturing Co., Cudahy, Wis., a corporation of Wisconsin Application March 16, 1954, Serial No. 416,562

14 Claims. (Cl. 198—19)

This invention pertains to conveyors, and more especially to conveyors designed to deliver articles to any of a series of processing units. Merely by way of example but without limiting intent, the conveyor of the present invention may be employed for delivering bottles to a series of labeling machines, it being understood that when, hereinafter, bottles are referred to as the articles to be handled, this is merely by way of illustration and that the apparatus is capable of handling other articles, in particular, cylindrical articles of greater axial length than diameter, for instance, cans and that, whereas labeling machines are hereinafter referred to, such machines are merely by way of example of units of apparatus which may be employed for performing some operation on the articles which are carried by the conveyor.

Conveyors of the above type usually comprise a constantly moving support, for example an endless chain having a substantially horizontal smooth surfaced run on which the bottles stand with their axes vertical as they move along a path from which the bottles are diverted for delivery to successive labeling machines spaced along said path. It is obviously desirable that each labeling machine of the series be supplied with bottles as rapidly as the machine can handle them; thus the receiving end of the conveyor should be of a capacity to accommodate the aggregate number of bottles which can be handled by all of the labeling machines of the series when working at full capacity. On the other hand, it is necessary, at times, to stop one or another of the labeling machines, for instance to insert a new supply of labels in the label magazine or to replenish the glue box; moreover, the demand for labeled bottles may diminish so that less than the full number of labeling machines may be needed to do the work while, on the other hand, an increase in demand beyond the capacity of those machines already installed may require the installation of added labeling machines to the original series.

In apparatus of this type, particularly when handling bottles or other fragile articles, it is desirable to avoid too high a velocity of travel of the articles thereby to minimize breakage, and also to prevent jamming of articles as they are diverted into different paths, for instance in passing from a main line of the conveyor into branch lines leading to individual labeling machines.

The patent to Carter 2,615,555, October 28, 1952, discloses one very successful type of conveyor of the above kind, but since, in the patented machine, it is necessary to provide parallel guideways corresponding to each of the labeling machines of the series respectively, the increased width of the conveyor if the number of labeling machines be substantially increased, may become prohibitive, for example because of space limitations; difficulty in servicing the machine when the conveyor track is of excessive width; or because the addition of further guideways and conveyors necessitates an undue complication in or excessive cost of the drive mechanism.

Objects of the present invention are to provide a conveyor of the above type so devised that it may readily be adapted to serve a small number, for instance less than four labeling machines or to serve a substantially greater number without necessitating fundamental changes in construction; substantial increase in the width of the conveyor trackage; or undue complication of drive means; or prohibitive increase in cost.

A further object is to provide novel conveyor means wherein, regardless of the number of labeling machines to be served, the receiving end of the conveyor trackway may be of a width well within the permissive dimensions for ease of servicing the conveyor; to provide conveyor apparatus wherein the bottles are advanced in a mass (without attempt to place them in independent parallel paths according to the number of labeling machines) but with provision for insuring the delivery to each labeling machine of the series of the maximum number of bottles which each individual machine can handle at any given time; to provide for the return of bottles from the delivery end of the conveyor trackway toward the receiving end and their incorporation in the main stream of bottles if, for any reason, bottles pass the entrance to the last labeling machine of the series without being diverted from the main track; to provide bottle diverting means of improved type easily adaptable to different operating conditions; and to provide improved means for preventing jamming of bottles at the entrances to the branch tracks leading from the main conveyor to the individual labeling machines. Other and further objects and advantages of the invention will be pointed out in the following more detailed description and by reference to the accompanying drawings, wherein—

Fig. 15 is a fragmentary plan view, to larger scale than

Fig. 1, showing a switch of a type different from that illustrated in Fig. 8;

Fig. 19$^a$ is a view similar to Fig. 19, showing the terminal end portion of the same conveyor;

As above suggested, the conveyor apparatus of the present invention is of especial value in that it provides a ready means whereby the length of the apparatus may be varied so that it may readily be extended to serve a larger number of article processing units than was originally intended, without unduly widening the conveyor trackage so as to interfere with ready servicing of the apparatus. While the ultimate capacity of a given conveyor, according to the present invention is limited by the size of the articles to be handled, the invention makes it possible, by relatively slight modification, and without departing from the basic features of the invention, to adapt the apparatus to handle larger articles but with the same capacity so far as the number of articles per unit of time is concerned.

Figure 20:
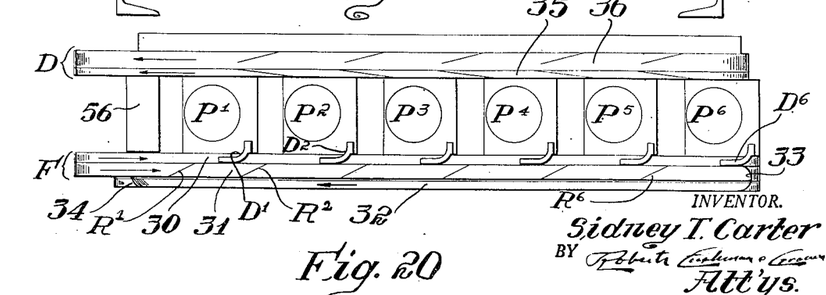
Fig. 20 is a diagram, to small scale, illustrative of the conveyor of Fig. 1.

One desirable embodiment of the invention is shown diagrammatically in Fig. 20, and for purposes of illustration, but without limitation, it may be assumed that this apparatus is for processing articles such as pint bottles, for instance, for delivering such bottles to a series of label-applying machines and for taking the labeled bottles away from the machines. In this connection labeling machines are merely referred to as examples of machines or devices, all of the same character, and which perform some operation on the articles which is carried by the conveyor apparatus. Hereinafter when reference is made to a labeling machine such designation is merely intended as illustrative of the particular kind of processing unit, and when reference is made to a bottle it is likewise to be understood that this is merely illustrative of any article which might be handled by the conveying apparatus of the invention.

Referring to Fig. 20, the characters P1, P2, P3, P4, P5 and P6 indicate processing units, all designed to perform the same operation, there being six such units as illustrated in this figure. The conveyor means for supplying or feeding articles to these units is designated generally by the character F, while the conveyor means for taking the processed articles away from the processing units is designated generally by the letter D. The conveyor means for supplying or feeding the articles to the several processing units comprises a rear conveyor having a horizontal article-supporting run 30, an intermediate conveyor having a horizontal article-supporting run 31, and the front conveyor having the article-supporting run 32. Each of these article-supporting runs has a surface (for example, made up of a series of smooth metal plates) such that an article resting thereon may readily be slid transversely of the conveyor without tipping. The runs 30 and 31 move in the same direction and to the right as indicated in Fig. 20, while the conveyor run 32 moves in the reverse direction, that is to say, to the left as viewed in Fig. 20.

A diverter D1, D2, . . . D6 is associated with each of the processing units P1, P2, etc., each diverter being so designed that any articles resting upon the rear run 30 of the conveyor system, and which, when so resting on the rear conveyor run, approach one or another of the diverters, are picked off from the conveyor run 30 and delivered to the corresponding processing unit.

The combined widths of the conveyor runs 30 and 31 is sufficient, at the receiving end of the apparatus, to accommodate a sufficient number of articles, when the conveyor runs are moving at the proper speed, to supply all of the processing units simultaneously when they are all working at maximum capacity. Desirably, the articles are delivered to this feeder conveyor system so that the articles move along in a disorderly mass, that is to say, without any attempt to dispose them in rows or tandem relation on the two conveyor runs 30 and 31. It will be noted that there is no dividing wall or walls bebetween the remote edges of the runs 30 and 31 so that, except as hereinafter described, articles placed on the receiving ends of these two conveyor runs are free to move transversely across from one run to the other and back again.

In order to assure the presentation to each of the diverters D, D1, etc. of a sufficient number of articles to supply any particular processing unit to its maximum capacity, there is provided, in advance of each diverter D1, D2, etc. an associated deflector R1, R2, etc. These deflectors normally extend across the run 31 in an inclined direction so that articles supported by the run 31 and advancing with the latter toward the right, when they engage one of these deflectors, are urged rearwardly toward the conveyor run 30. These deflectors, as hereinafter more fully described, are yieldable in response to abnormal pressure of articles against them so that they may flex or swing into a position where they are more nearly parallel to the direction of motion of the conveyor run. Thus when as many articles have been deflected onto the run 30 as can be taken care of at any instant by the corresponding diverter, the associated deflector will swing or flex so that succeeding articles, moving along the conveyor run 31, will not be moved over onto the conveyor run 30 but may continue along the run 31 and pass that diverter which, for the instant, is receiving all of the articles which it can accommodate. It will be understood in this respect that it is really the processing unit which determines how many articles can be diverted from the conveyor run 30 by any given diverter.

At the terminal end of the conveyor, that is to say, beyond the last diverter D6 of the series, there is provided transfer means 33 shown in Fig. 20 as a stationary, curved surface which is engaged by any article on the conveyor 31 which passes the last diverter D6 without being removed from the conveyor run 30. This curved surface causes the article to move forwardly and onto the conveyor run 32, the latter, as above noted, traveling reversely to the conveyor runs 30 and 31. As illustrated in Fig. 20, an article thus placed on the conveyor 32 travels backwardly until it nears the receiving or feed end of the apparatus where it is engaged by the switch device 34 (shown in Fig. 20 as a stationary, curved surface) which restores the article to the conveyor run 31 so that it mingles with the articles which are being delivered onto the latter conveyor run at the feed end of the machine and is carried along with such articles in the same way as though it had not previously traversed the length of the conveyor system.

As illustrated diagrammatically in Fig. 20, conveyors having runs 35 and 36 are arranged to receive articles from the several processing units D1, D2, etc. and to convey such articles to the delivery end of the apparatus. However, since the present invention is not concerned with the particular way of handling the articles after they have been processed by the units P1, P2, etc. it is unnecessary to describe the conveyors 35 and 36 in further detail.

Figure 1:
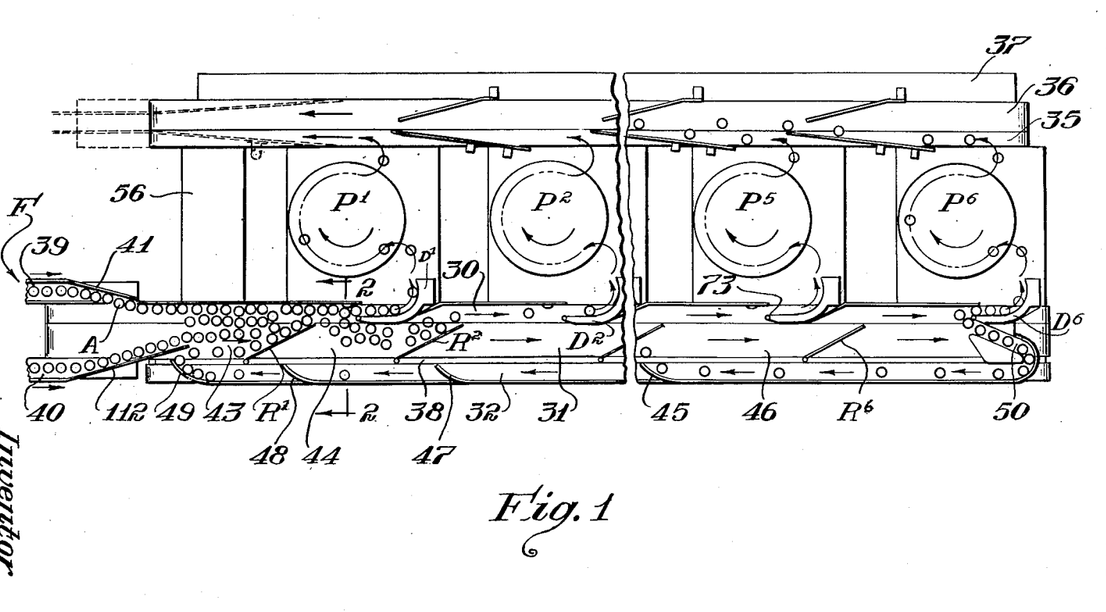
Fig. 1 is a diagrammatic plan view of apparatus (the mid portion of which is omitted) embodying the present invention, designed to supply articles to a series of independent machines or devices operative to process the articles, for example bottles, the apparatus shown in Fig. 1 being designed to handle relatively small articles, for instance bottles not exceeding one pint size.

Referring to Fig. 1, which shows, to larger scale, the right-hand and left-hand end portions only of actual apparatus of the type illustrated in Fig. 20 (the central portion of the apparatus being broken away), the conveyor runs 31 and 32 are shown as separated by a stationary plate 38 which extends longitudinally of the apparatus and which lies in the same horizontal plane as the several conveyor runs 30, 31 and 32. At the left-hand or feed end of the apparatus two supply conveyors 39 and 40 are illustrated, merely by way of example, of means for furnishing articles to the apparatus of the present invention. As shown, each of these two conveyors 39 and 40 advances articles in single file to a position where the articles are engaged by the inclined fixed guides 41 and 42 respectively, these guides converging so that the articles supplied by the two conveyors are deposited on the receiving end portions of the two conveyor runs 30 and 31, the articles becoming intermingled without any particular order in the space 43 just to the left of the first deflector R1. As illustrated, the effect of the deflector R1 is to crowd the articles over toward the rear conveyor run 30, so that they are in a position to be picked up by the stationary diverter D1, and thus delivered into the field of action of the first processing unit P1. The arrows in this view suggest the path which the articles may take after delivery to the unit P1, and as they are carried through the latter unit and then delivered to the conveyor 35. Assuming that the articles are fed into the space 43, at a rate substantially faster than the first processing unit P1 can handle them, the deflector R1 will move, in response to the pressure of articles accumulating in the space 43, thus allowing some of the articles to move along into the space 44. The second deflector R2 will then urge these articles in the space 44 over toward the rear conveyor run 30 so that articles are thus supplied to the second diverter D2—this operation being repeated as many times as there are processing units in the series, assuming that a sufficient quantity of articles are fed to the receiving end of the apparatus to supply all the processing units at the same time.

In the arrangement shown in Fig. 1, a switch member is shown at 45, at a point to the left of the last deflector R6 of the series, so that any articles which are transferred by the front conveyor run 31 to the conveyor run 32 at the terminus of the conveyor system will be switched back by the switch member 45 onto the conveyor run 31 so as to enter the space 46 immediately to the left of the last deflector R6. Such articles will then be urged by the deflector onto the rear conveyor run 30, and thus, under usual conditions, will be picked off by the last diverter D6 and delivered to the unit P6.

Assuming that all of the processing units are in operation at the same time, there would ordinarily be but few of the articles which would pass the last diverter D6, without having been removed from the conveyor run 30, but in the event that one of the processing units should be shut down for any reason and assuming that the number of articles arriving at the receiving end of the apparatus remains constant, there will be a surplus of articles traveling toward the right hand end of the apparatus and these surplus articles will be transferred, as above described, to the front conveyor run 32 and will circulate between the switch 45 and the terminus of the apparatus until all of the processing units are again restored to operation. As hereafter described, the switch may be removable, or shiftable from one location to another, for instance to any of the positions indicated at 47, 48 and 49 respectively. For example, if several of the processing units are to be shut down for a considerable length of time, it may be desirable to place the switch at some point such as 49 so that the returning surplus articles will be traversed past all of the units which are in operation and thus move through a longer circuit than though the switch were at the point 45. On the other hand, the switches may be permanently located at any of the points 45, 47, 48, 49, etc. but of a type such that if, for example the space 46 becomes filled with articles the switch 45 will automatically open to allow articles to continue on to a point nearer the receiving end of the machine. As illustrated in Fig. 1, the transfer means at the right hand end of the apparatus comprises means defining a channel 50 leading from near the receiving end of the diverter D6, and extending in a reverse curve so as to transfer the articles to the conveyor run 32. This arrangement is more clearly illustrated in Fig. 12, where the parts are shown to much larger scale. The channel 50 has a straight entrance portion defined by a block 51 secured to the diverter D6 and a hollow member 52 which is fixed to the stationary plate 38. A curved part 53 is secured at one end to the block 51 and at its other to the front vertical wall 54 of the conveyor trackage, and together with portions of the member 52 defines the curved part of the channel 50. The straight entrance portion of the channel extends diagonally across the conveyor run 31 and the substantially semicircular portion of the channel terminates above the conveyor run 32 so that articles passing through this channel 50 are deposited on the conveyor run 32. The front wall 54 extends along the front edge of conveyor run 32.

Figure 2:
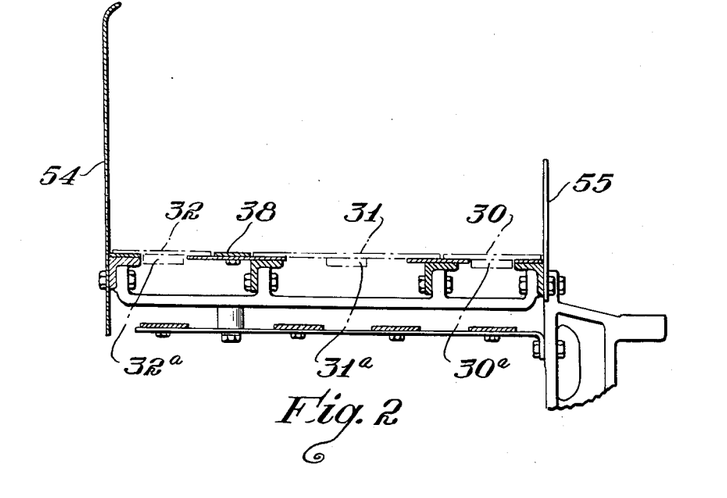
Fig. 2 is a transverse vertical section substantially on the line 2—2 of Fig. 1 but to larger scale.

In Fig. 2, which is a cross-sectional view to larger scale than Fig. 1, the front wall is indicated at 54 and a corresponding rear wall 55. Cam shaped members are mounted on the side rail 55 (see Fig. 1) whose function is substantially the same as that of the "barrier 24" of the patent to Holm 2,215,702, September 24, 1940. The upper runs 30, 31 and 32 of the conveyors are supported by stationary, horizontal guide rails so spaced apart as to provide, between the proximate edges of adjacent rails, spaces in which the chains 30ª, 31ª and 32ª of the respective conveyors may travel.

Referring again to Fig. 1, the numeral 56 designates a support or table, forming a part of the machine frame, on which the drive motor and reduction gear mechanism for driving the several conveyor chains are mounted.

Figure 13:
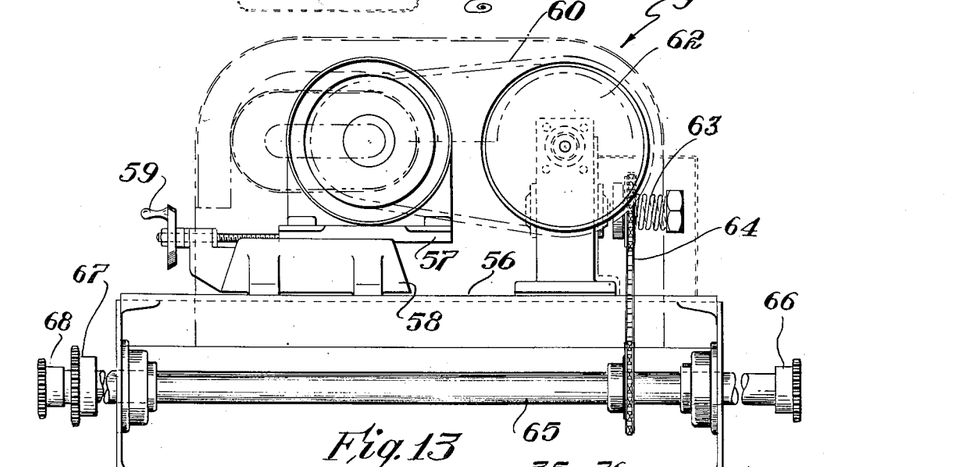
Fig. 13 is an end elevation, looking from the left hand side of Fig. 1, and to much larger scale, showing the drive connections for the conveyor.
Figure 14:
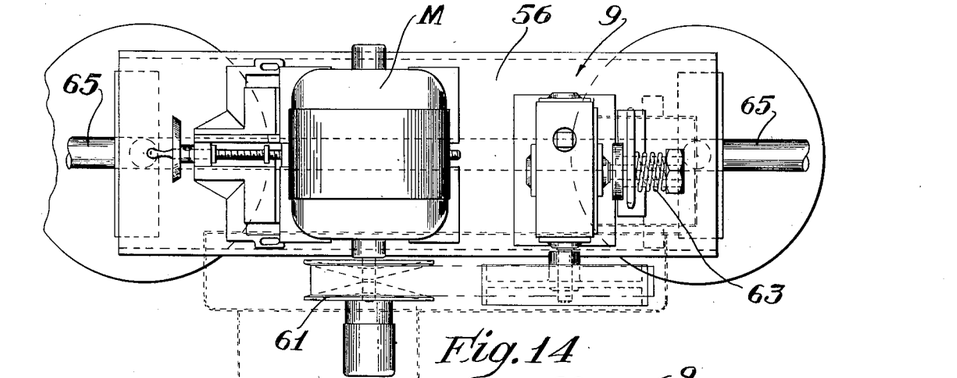
Fig. 14 is a plan view of the parts shown in Fig. 13.

As illustrated in Figs. 13 and 14, the drive motor M is mounted on a carriage 57 which is guided for transverse movement on a block 58 mounted on the support 56. By means of a screw-threaded shaft and a crank 59 the motor may be moved transversely of the machine for varying the tension on the belt 60 which passes about a pulley 61 on the motor shaft and also about a pulley 62 on the shaft of a reduction gearing device 63 which may be of any conventional type. Desirably the pulleys 61 and 62 are of the type used in a so-called "Reeves" drive such that by varying the tension of the belt 60 the speed of the shaft of the reduction pulley 62 may be varied. The delivery shaft of the reduction gearing mechanism drives a shaft (through an interposed friction clutch device including the spring 63) on which is mounted a sprocket wheel over which an endless sprocket chain 64 is trained, this chain also passing about a sprocket wheel on the transverse shaft 65 which is mounted in bearings in the front and rear longitudinal rails of the machine frame.

At its forward end, and forwardly of the front frame rail, the shaft 65 is provided with a sprocket wheel 66 about which is trained the chain of the conveyor having the upper run 32. Sprockets 67 and 68 on the rear end of shaft 65 drive the chains which carry conveyor runs 35 and 36.

At the right hand or terminal end of the conveyor apparatus the chains of the delivery conveyors 35 and 36 (Fig. 1) are trained about sprocket wheels on a transversely extending shaft (not shown) on which is mounted a gear which meshes with a gear on a parallel shaft which extends forwardly and which is provided on its forward end portion with sprockets about which the chains of the conveyors 30 and 31 are trained. Thus the conveyors 30 and 31 move oppositely to the conveyors 30, 35 and 36. A generally similar way of driving conveyors in opposite directions at the front and rear of a conveyor apparatus is more fully described in the patent to Carter, above referred to.

Figure 12:
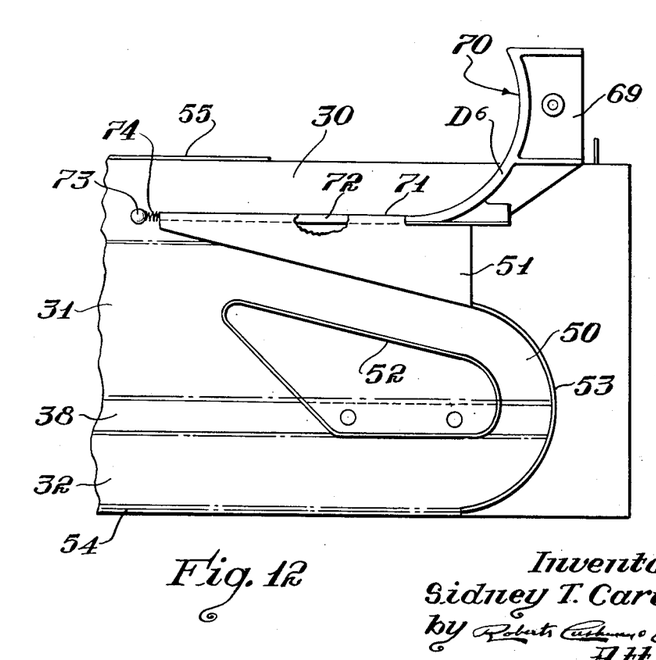
Fig. 12 is a fragmentary plan view, to larger scale than Fig. 1, showing the right hand terminal portion of the conveyor.
Figure 15:
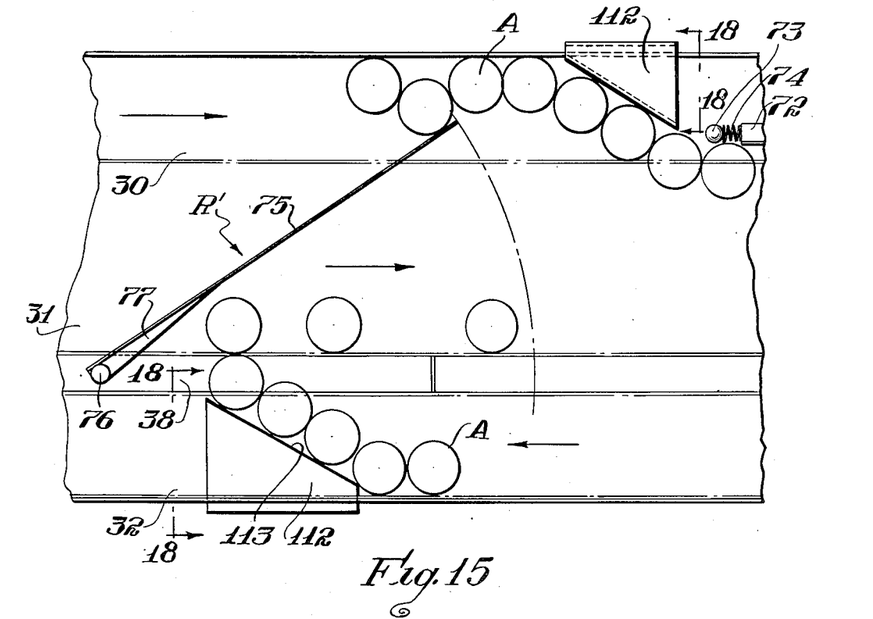
Figure 16:
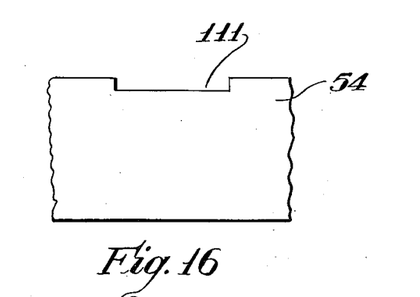
Fig. 16 is a fragmentary elevation of one of the outer walls of the conveyor path shaped to accommodate a switch such as shown in Fig. 15.
Figure 17:
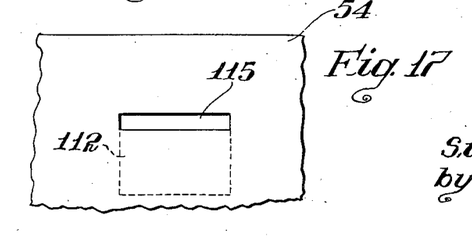
Fig. 17 is a fragmentary elevation of the outer wall of the conveyor, showing it provided with a window to accommodate a switch such as shown in Fig. 15.
Figure 18:
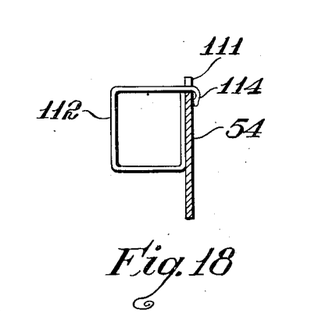
Fig. 18 is an elevation partly in vertical section on the line 18—18 of Fig. 15.
Figure 19:
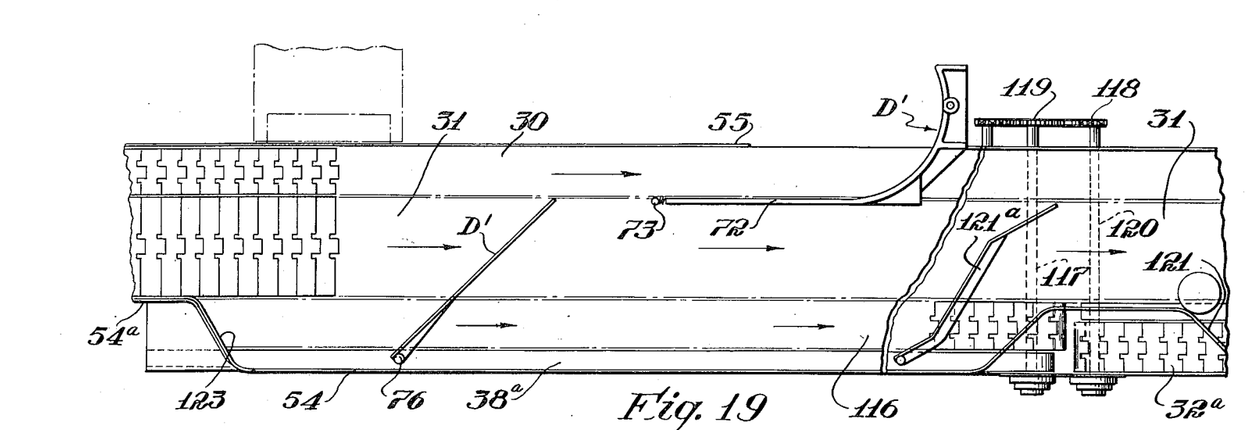
Fig. 19 is a diagrammatic plan view illustrating the receiving end portion of a conveyor of modified construction particularly designed to handle articles of larger sizes than those for which the conveyor of Fig. 1 is designed.
Figure 19A:
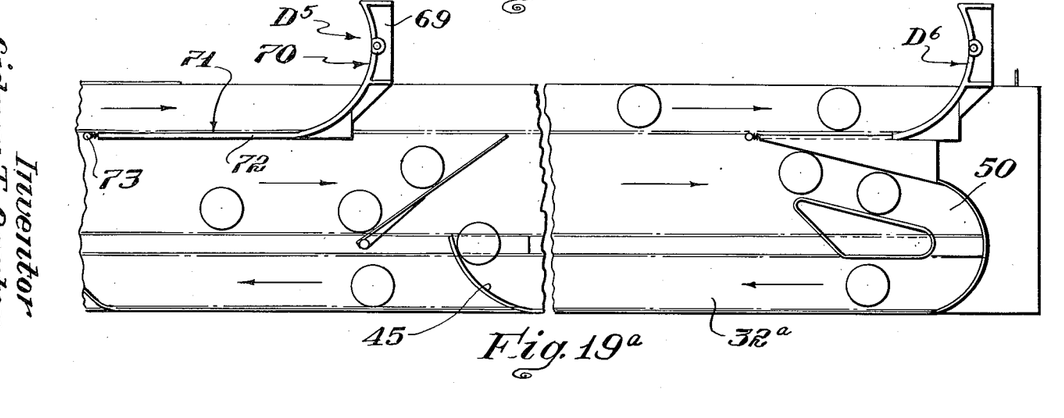

The diverters D1, D2, etc. are preferably of the construction illustrated for example, in Figs. 12, 15 and 19a. Thus, each diverter may comprise a rigid casting 69 which is suitably fixed to the machine frame and which has the concavely curved surface 70 which, at its forward end, merges in tangent relation to a rectilinear surface 71, forming the rear face of a longitudinally extending rigid bar 72, which may be fixed to the casting 69. As illustrated in Figs. 12 and 19a for example, the left-hand end of the diverter is formed by a ball 73, such for example as a steel ball bearing, which is carried by the end of a coiled spring 74 whose opposite end is attached to the bar 72. As illustrated, for example in Fig. 1, this terminal portion or ball 73 is located slightly rearward of the forward edge of the conveyor run 30, so that the major portion of articles traveling along the conveyor run 30 will pass to the rear of the bar 72, and thus be engaged with the curved surface 70 of the casting 69 and so swept off from the conveyor run 30 and delivered to the corresponding processing unit. However, if an article moving along the conveyor run 30 is directly in alignment with the bar 72, it will contact the ball 73 and, because the latter is smooth and yieldingly supported, the ball will swing either rearwardly or forwardly, thus causing the article to move to one side or the other of the bar 72 and so avoiding the possibility of the bridging of articles in approaching the diverter. Those articles which are guided by contact of the ball 73 to move forwardly will pass from the conveyor run 30 to the conveyor run 31, and thus continue on past the diverter toward the right hand side of the apparatus.

Figure 5:
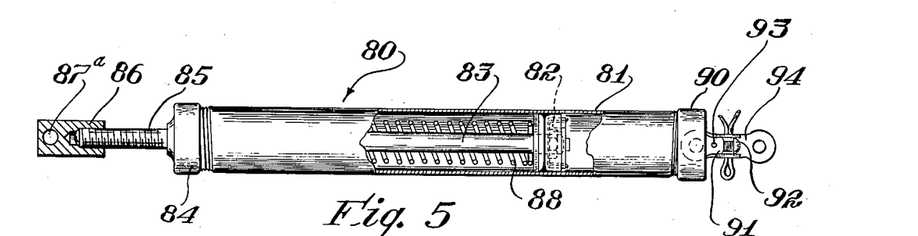
Fig. 5 is a plan view, partly in diametrical section, of the controlling device for the deflector of Fig. 3.
Figures 6, 7, 21:
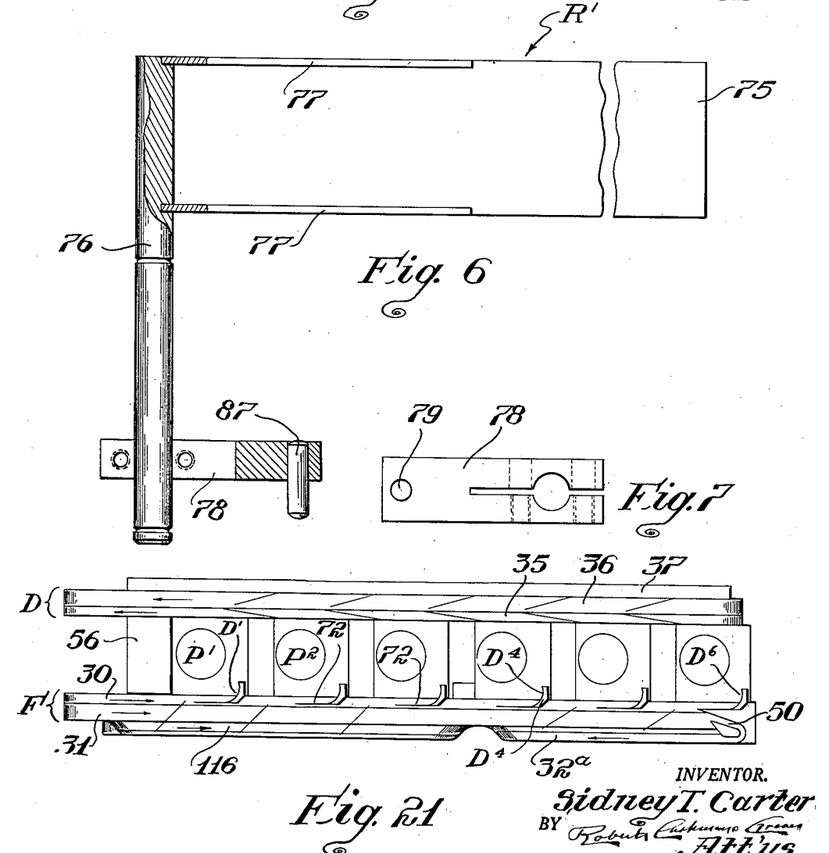
Fig. 6 is a face view, with parts broken away and in section, of the deflector of Fig. 3, showing the shaft on which it is mounted.
Fig. 7 is a plan view of a crank arm which is fixed to the lower end of the deflector shaft shown in Fig. 6.
Fig. 21 is a diagram to small scale illustrative of the conveyor of Fig. 19.

The deflectors R1, R2, etc. are preferably of the type illustrative, for example in Figs. 5, 6 and 7, although it is to be understood that deflectors of other types may be employed if desired. Merely for convenience in reference, the deflector illustrated in Figs. 5, 6 and 7, also in Fig. 15, is designated by the character R1, it being understood of course, that the other deflectors will be of the same general type. The deflector preferably comprises an elongate flexible blade 75 of sheet material fixed at one end to the upper part of a vertical shaft 76 and preferably having reinforce webs 77 adjacent to that part which is connected to the shaft so as to stiffen this base portion of the deflector blade. The shaft 76 extends down through bearings in the stationary plate 38 and at a point below this plate is provided with a crank arm 78 (Figs. 6 and 7), which is adjustably secured to the shaft 76 so that the angular relation of the arm to the blade 75 may be varied as desired. For controlling the deflector there is provided a check device 80 (Fig. 5) here shown as of a type generally similar to the check devices used for preventing the slamming of doors. This check device, as illustrated, comprises an elongate, cylindrical tube 81 in which there is arranged a piston 82 fixed to one end of a piston rod 83, the latter extending out through a cap 84 at one end of the cylinder, the outer end portion of the rod being screw-threaded as shown at 85 for engagement in a screw-threaded bore in a block 86. A pin 87 fixed in arm 78 is journaled in a bore 87a in block 86 and forms a pivotal connection between the block 86 and the arm 78. A coiled spring 88 within the cylinder 81 constantly urges the piston toward the right, as viewed in Fig. 5. The right-hand end of the cylinder 81, as viewed in Fig. 5, is provided with a closure cap 90 having an outwardly projecting boss 91 provided with a screw-threaded bore which receives the adjusting screw 92. A small port 93 leads from the bore in this boss 91 to the outer atmosphere, and the effective size of this port may be adjusted by turning the screw 92.

Figure 3:
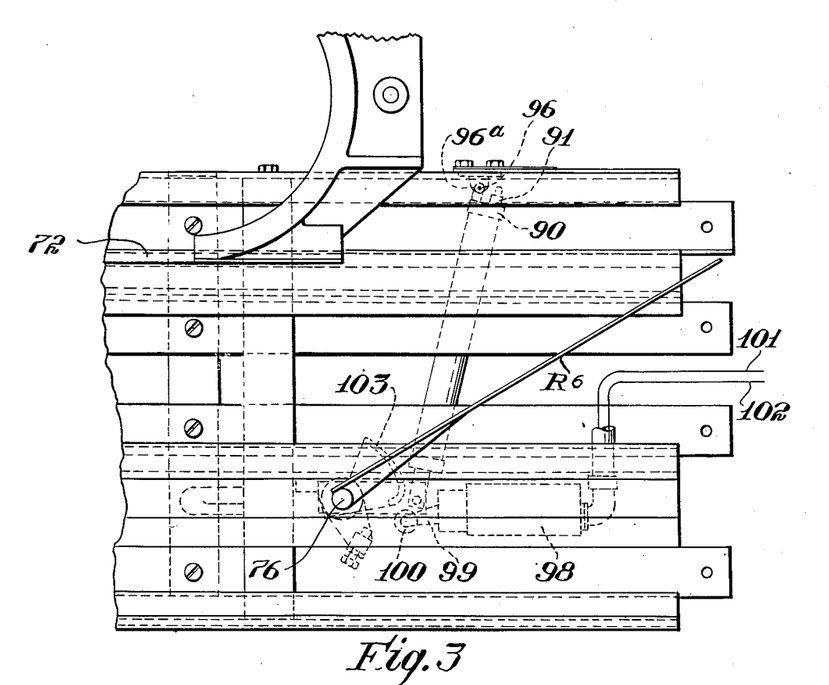
Fig. 3 is a fragmentary plan view, to larger scale than Fig. 1, showing one of the fixed, article diverters and the article deflector associated with the next successive diverter of the series.

A shackle 94 is pivotally connected to the cap 90 and likewise to a pivot pin 96 (Fig. 3) carried by a bracket 96a secured to the frame of the machine at the rear side of the latter. This arrangement provides for resiliently opposing the swing of the deflector arm 75 in response to the pressure of articles supported by the conveyor run 31, and likewise limits the speed of return of the deflector arm toward its normal position when the pressure is relieved.

Figure 4:
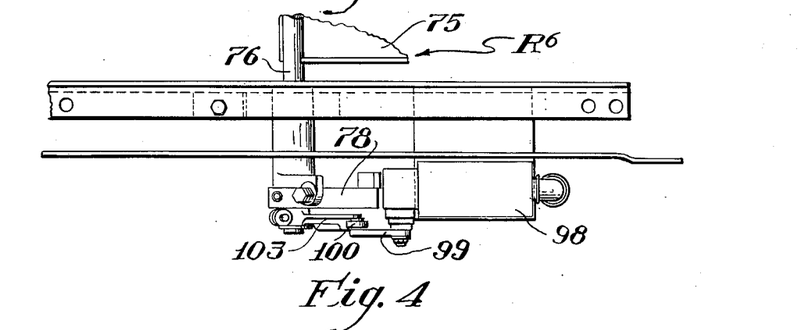
Fig. 4 is a fragmentary side elevation of some of the parts shown in Fig. 3.

In order to provide automatic control for the supply of articles to the receiving end of the conveyor, at least the last deflector of the series, that is to say, the deflector R6 (Fig. 20) is preferably designed to control the motor which drives the feed conveyors (for instance the conveyors 39 and 40, Fig. 1) which supply the articles to the receiving end of the apparatus. For this purpose there is associated with this last deflector R6 a switch 98 (Figs. 3 and 4) which may, for example, be a switch of the "micro" type, having a contact actuating rocker arm 99 desirably provided with an anti-friction roll 100 at its free end. The switch 98 is normally set to close a circuit comprising the conductors 101 and 102 (Fig. 3) which supplies current to the motor (not shown) which drives the feed conveyor or conveyors above referred to. So long as this switch 98 is closed the motor runs and supplies articles at the normal speed to the receiving end of the conveyor apparatus. For actuating the switch arm, a cam 103 (Fig. 3) is fixed to the lower end of the shaft 76, the cam being so contoured that when the deflector R6 is swung to a position generally parallel to the direction of movement of the conveyor runs, that is to say, when the space just to the left of the diverter D6 becomes over-crowded with articles, the switch arm 99 will be moved so as to break the circuit through the motor which drives the feed conveyors, thus temporarily stopping the delivery of articles to the receiving end of the apparatus.

If desired, a motor-controlling switch mechanism such as just described may be associated with each of the deflectors R1, R2, etc., so that undue accumulation of articles in front of any deflector will serve temporarily to cut off the supply of articles to the conveyor. While as here illustrated, the deflector controls an electric motor which drives the supply mechanism, it is contemplated that other means may be employed for the purpose. For instance, the deflector may, in response to pressure of an accumulation of articles against it, actuate an air valve such as is illustrated in Fig. 10 of the above-named patent to Carter, and thereby cause a barrier to move across the trackage so as temporarily to prevent advance of articles therealong.

Figure 8:
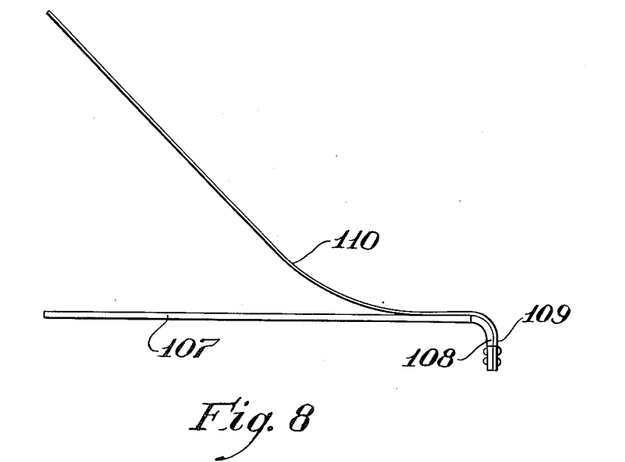
Fig. 8 is a plan view of a normally stationary but adjustable switch arm for returning articles to the main conveyor.
Figure 9:
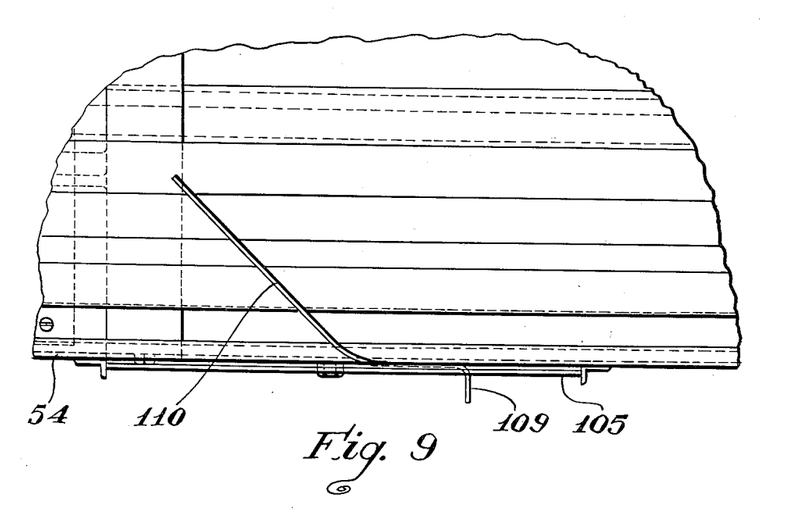
Fig. 9 is a fragmentary plan view showing the switch arm of Fig. 8 mounted on the outside wall of the conveyor.
Figure 10:
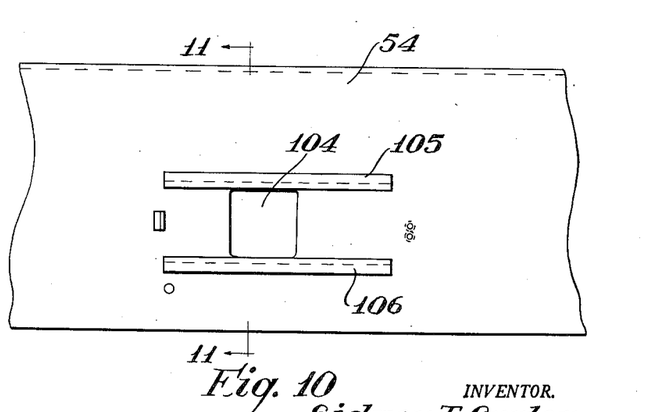
Fig. 10 is a fragmentary side elevation, to smaller scale, of the outer wall of the conveyor, showing a window therein through which the switch arm of Fig. 8 projects.
Figure 11:
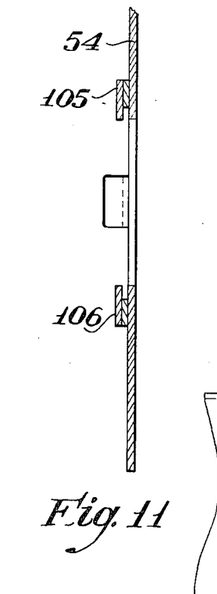
Fig. 11 is a vertical section, to large scale, substantially on the line 11—11 of Fig. 10.

The switch devices, such as those indicated at 45, 47, 48, etc. in Fig. 1, are desirably of the flexible type illustrated in Figs. 8, 9, 10 and 11, respectively. To accommodate this type of switch, the front wall 54 of the conveyor trackage is provided with windows 104 (Fig. 10) at suitable intervals, for instance, approximately midway between the locations of the shafts 76 which carry successive deflectors R1, etc. Above and below each window there are provided guides 105, 106 respectively, which cooperate to provide a guideway for a longitudinally movable slide 107 (Fig. 8). One end of this slide is bent forwardly as shown at 108 (Fig. 8), and to this end there is secured one end 109 of a flexible switch arm 110, for example, of sheet steel, this arm being deflected away from the slide 107 when in normal position, as illustrated for example, in Fig. 8. In assembling this switch device with the front wall 54 of the conveyor the free end of the arm or blade 110 is passed through the windows 104 and the left-hand end of the slide 107 is entered into the right-hand end of the guideway provided by the members 105 and 106. By moving the slide lengthwise of the guideway, using the united parts 108 and 109 as a handle, the angle of deflection of the blade 110 may be varied and likewise its stiffness, so that it can be caused to extend to a greater or lesser degree across the pathway provided by the return conveyor 32 and thus return more or less of the articles traveling on the un 32 to the conveyor run 31. By providing windows 104 at the points above suggested it is possible to arrange switches, such as that shown in Fig. 8, to return all or a part of the articles from the conveyor run 32 to the conveyor run 31 at any desired part of the conveyor apparatus. Since the switches shown in Fig. 8 may easily be removed and shifted to another one of the windows 104, it is readily possible to accommodate the apparatus to a variety of conditions.

Instead of the flexibly resilient and adjustable switch illustrated in Fig. 8, switches such as illustrated in Figs. 15 to 18 may be employed. For using this latter switch, the walls 54 and 55 of the conveyor may be provided with notches 111 (Figs. 16 and 18) at the proper intervals, and the switch itself may consist of a hollow, triangular box formed from sheet material having the inclined face 113 (Fig. 15) shown extending transversely across the conveyor run 32 and which is operative, as suggested in Fig. 15, to switch articles from the run 32 onto the conveyor run 31. For supporting the switch device 112, the upper wall of this device is provided with a hook member 114 (Fig. 18) which fits down into the notch 111 in the upper edge of the wall 54, the hook being preferably somewhat resilient so as to require that it be sprung down over the edge of the notch, thus holding the switch device securely in position until it is purposely removed. With this arrangement, all of the articles carried on the conveyor run 32 and which approach such a switch device are deflected so as to move rearwardly and across the stationary plate 38 on to the conveyor run 31.

Instead of providing the notches 111 in the conveyor wall, the wall may be provided with elongate windows 115 (Fig. 17) for the reception of the retaining hook member 114 of the switch device, the latter then being positioned below the upper edge of the wall 54.

As illustrated in Fig. 15, one of the switches 112 may be arranged in advance of any of the diverters, for example when the corresponding processing unit is idle, to switch all of the articles on conveyor run 30 to conveyor run 31 as they approach said diverter.

As above noted, the apparatus of Fig. 20 and which is shown in more detail in Fig. 1, is designed more especially for handling relatively small articles, for instance, pint size bottles. The arrangement shown in Figs. 19, 19a, 20 and 21 is in general similar to that of Figs. 20 and 1, but shows how the conveyor apparatus, without increase in front to rear dimensions may easily be modified to handle articles of larger size, for example, quart bottles. The arrangement shown in Fig. 21 is in general similar to that shown in Fig. 20, except that whereas in the arrangement of Fig. 20, the front conveyor run 32 extends from the right hand to the left hand end of the apparatus and moves reversely to the conveyor runs 30 and 31, in the arrangement of Fig. 21, the front conveyor comprises two independent parts, the part 32a at the right-hand end of the apparatus corresponding to the run 32 of Fig. 20, but which, instead of extending the full length of the apparatus, terminates at a point just to the left of the diverter D4, while a second conveyor run 116, aligned with the run 32a, moves in the same direction as the conveyor runs 30 and 31. Because of the greater weight to be transferred it is preferred, though not essential, to drive the two front conveyor runs 116 and 32a by means of an independent motor. This motor (not shown) may be located below the conveyor trackage at a point near the proximate ends of the two conveyor runs 116 and 32a (Fig. 19). This motor may drive an endless sprocket chain which engages sprocket wheels 118 and 119 in such a way as to turn these sprocket wheels in opposite directions. These wheels are fixed to the rear ends of parallel shafts 120 and 117 respectively, whose forward ends carry sprockets which engage the chains of the conveyor runs 116 and 32a respectively, thus driving these conveyor runs in opposite directions.

In this arrangement there is provided a stationary switch device 121 (Fig. 19) which insures that any article carried by the run 32a of the return conveyor, which approaches the terminal end of the return conveyor will be switched over onto the conveyor run 31. A special form of deflector 121a is arranged to the left of switch 121, this deflector being so shaped as to permit it to swing downwardly and nest over the switch device 121.

In this arrangement, the fixed longitudinally extending supporting plate 38a is arranged in front of the conveyor run 116 at the left-hand portion of the apparatus, and the pivot shafts for the deflectors D1, D2, etc. and the deflector 121 pass down through bearings in this fixed plate 38a, these deflectors being controlled in the same way as the deflectors D1, D2, etc. previously described.

With this arrangement, as illustrated in Fig. 19, the articles are supplied by conventional means, not shown, to portions of the conveyor runs 30 and 31 which extend to the left of the apparatus proper, and as they approach the first deflector D1 they tend to accumulate in the space to the left of this deflector D1, the front wall 54 of the apparatus being provided with an end portion 123 which extends across the front conveyor run 116 and which is united to a wall 54a extending along the forward edge of the conveyor run 31 at the left-hand end of the apparatus. This arrangement provides for the accommodation of a substantial number of articles of relatively large size to the left of the deflector D1. The part 72 of the diverter D1 is disposed in a position such as to free the entire width of the conveyor run 30 for the reception of articles of a diameter substantially as great as the width of the conveyor run, whereas as will be noticed from inspection of Fig. 1, the corresponding longitudinally extending portion of the diverter is located between the front and rear edges of the conveyor run 30 so that there is not room for articles of a diameter equal to the width of the run 30 to pass to the rear of the part 72. The arrangement at the right-hand end of the apparatus, as shown in Fig. 19a, is substantially like that shown in Figs. 1 and 20, the switch devices 45 being arranged at desired points between the terminal end of the trackage and the switch 121 at the left-hand end of the conveyor run 32a. Thus by this arrangement, without increasing the width of the conveyor trackage as a whole, it is possible to handle relatively large or relatively small articles. Likewise, without increasing the width of the conveyor trackage it is possible, merely by increasing its length, to supply articles to a greater or less number of processing units. This is a great advantage in commercial installations since it enables the user to adapt a basic mechanism of a given conveyor system to supplying an increased number of processing units as business increases; without requiring more floor space from front to rear; and without necessitating the widening of the conveyor trackage to an extent making it difficult if not impossible for the operator to reach across the trackage to remedy conditions arising at the rear part of the latter.

While certain desirable embodiments of the invention have herein been disclosed by way of example, it is to be understood that the invention is broadly inclusive of any and all modifications falling within the terms of the appended claims.

I claim:

1. Conveyor apparatus comprising two endless conveyors, each comprising a horizontal run extending from the receiving to the terminal end of the apparatus, said runs being in the same horizontal plane, the combined widths of said runs, at the receiving end at least of the apparatus, being sufficient to accommodate the maximum number of articles to be conveyed, a plurality of stationary diverters spaced apart longitudinally of the apparatus, each respective diverter being operative to divert articles which approach it while carried by one of said conveyor runs, and yielding means operative to urge articles carried by the other conveyor run toward the first conveyor run as the articles approach the field of action of each successive diverter.

2. In combination with a conveyor designed to supply articles to any one of a series of article processing units, the conveyor providing an undivided path of a width to accommodate articles sufficient to supply all of said units when all are working at capacity, a diverter corresponding to each of said units, each diverter being so arranged as to extend across one margin of the conveyor path and to divert articles moving along said margin of the path for delivery to a corresponding one of said units, and a yieldable deflector in advance of each respective diverter, each deflector being operative to urge articles moving along any portion of the width of said path toward that margin of the path at which the corresponding diverter is located, thereby to insure reception of articles by the diverter to its full capacity, the deflector yielding, in response to pressure of articles, when the diverter refuses to receive any more articles, thereby to permit other articles to continue along the conveyor.

3. Apparatus according to claim 2, wherein each deflector is pivotally supported at one end adjacent to the opposite margin of the conveyor path, and yielding means normally holds the deflector so that it extends diagonally of the conveyor path but allows the deflector to swing about its pivotal axis in response to pressure of articles against its free end.

4. Apparatus according to claim 2, wherein the deflector is mounted on a rotatable vertical shaft journaled adjacent to the opposite edge of the conveyor path from that at which the diverters are located, the shaft having a second arm fixed thereto, a spring connected to said latter arm and which normally holds the deflector in position to crowd articles moving along the conveyor path toward the margin of the path at which the diverters are located, said spring being so designed as to permit the shaft to turn in response to a predetermined pressure of articles against the deflector arm, and delay action means operative to check free turning of the shaft.

5. Apparatus according to claim 2, wherein articles are supplied to the receiving end of the conveyor path by means which is driven by an electric motor, the motor circuit being controlled by a normally closed switch, and means responsible to the movement of a deflector, when moved to a predetermined extent by the pressure of articles against it, to operate the switch so as to break the motor circuit and thus temporarily stop the supply of articles to the conveyor.

6. An article diverter for use with a moving conveyor designed to move articles along a predetermined path, said diverter comprising an elongate, substantially rectilinear, rigid member extending parallel to the direction of movement of the conveyor and having an end which is opposed to the advancing articles, said end being constituted by a rigid ball carried by an elongate coiled spring.

7. Conveyor apparatus comprising a front conveyor, an intermediate conveyor and a rear conveyor with a stationary horizontal plate interposed between the front and intermediate conveyors, each of said conveyors comprising a rectilinear article-supporting run in the same horizontal plane with said plate, stationary diverters for removing articles carried by the rear conveyor run at any one of a plurality of longitudinally spaced points, means for urging articles carried by the intermediate conveyor run toward the rear conveyor run, means for moving the intermediate and rear conveyor runs in a direction to advance articles toward the receiving ends of the diverters, means for moving the front conveyor run in the opposite direction, means for transferring articles from the terminal portion of the horizontal run of the intermediate conveyor onto the front conveyor, and means for switching articles from the front conveyor onto the intermediate conveyor.

8. Conveyor apparatus comprising three conveyors each having a horizontal run, said runs lying in the same plane, means moving two at least of said runs in the same direction, said two runs being of a collective width at the receiving end of the apparatus to accommodate the maximum number of articles which are to be handled, a series of diverters spaced apart longitudinally of the apparatus, each of said diverters being operative to guide articles from the rear run of the conveyor, means yieldably urging all articles carried by the next adjacent conveyor run toward the rear run as the articles approach each of the diverters respectively, and means for switching all articles from the rear run to said next adjacent run at a point in advance of a selected diverter.

9. Apparatus comprising endless conveyors each having a horizontal article supporting run, said runs all being in the same horizontal plane, there being a rear, intermediate and front run at the receiving end of the apparatus, said several runs being in edge-to-edge relation and all moving in the same direction, but the front run being of lesser length than the intermediate run, the collective widths of said runs being sufficient to accommodate the maximum number of articles to be conveyed, diverters spaced longitudinally of the apparatus and each arranged to divert all articles which approach it while carried by the rear run, means yieldably urging articles carried by said intermediate and front runs toward the rear run, and means operative to return articles which pass the last diverter, without being diverted, to the intermediate conveyor run at a point in advance of the last diverter of the series.

10. Apparatus according to claim 9, wherein the front conveyor run terminates short of the terminal end of the apparatus and a fourth conveyor run, aligned with said front conveyor run but moving in the opposite direction, constitutes the means for returning articles which have passed the last diverter, without being diverted, to the intermediate run.

11. In combination, apparatus for automatically delivering articles to any of a series of article-processing units arranged in spaced relation in a rectilinear row, said apparatus comprising constantly moving conveyor means of the kind wherein the surface upon which the articles rest is so smooth that articles such, for example, as beverage bottles may be slid transversely of the conveyor means without tipping, the conveyor means defining a single, undivided path of a width to accommodate articles sufficient to supply all of the processing units when all are working at capacity, means for diverting articles from said path to any one of said units, article deflecting means comprising a movable deflector which normally extends diagonally of the conveyor path in advance of each respective unit, each deflector being resiliently yieldable in response to abnormal pressure of articles against it so that when any processing unit is being supplied to capacity, articles in excess of the requirements of said unit automatically move the deflector to permit them to proceed uninterruptedly along the conveyor path toward the next processing unit, and means operative to return articles, approaching the terminus of said path and which have not been diverted therefrom, to the conveyor at a point spaced from said terminus, the means for returning the articles comprising a conveyor parallel to the first conveyor means and moving in the opposite direction and having an article-supporting surface similar to that and in the same horizontal plane with that of the first conveyor means, a stationary device for transferring articles from the terminus of said path to said latter conveyor, and a switch for switching articles from the last-named conveyor back onto the first conveyor.

12. In combination, in apparatus for delivering articles to any one of a series of article-processing units, said apparatus comprising constantly moving conveyor means defining a single undivided rectilinear path of substantially uniform width from which articles are diverted for delivery to said units, means for diverting articles from said path, a conveyor parallel to and moving reversely to the first conveyor means, means for transferring any article, which approaches the terminus of said conveyor path without having been diverted therefrom, to the second conveyor, means for switching articles from the second conveyor into the path defined by said first-named conveyor means, a vertical wall which extends along the outer edge of the reversely moving conveyor, said wall having a window therein, a switch arm extending through said window from the outer side of the wall and which is operative to switch articles from the reversely moving conveyor to the first conveyor means, and means carried by the wall for adjustably supporting said switch arm.

13. In combination, in apparatus for delivering articles to any one of a series of article-processing units, said apparatus comprising constantly moving conveyor means defining a single undivided rectilinear path of substantially uniform width from which articles are diverted for delivery to said units, means for diverting articles from said path, a conveyor parallel to and moving reversely to the first conveyor means, means for transferring any article, which approaches the terminus of said conveyor path without having been diverted therefrom, to the second conveyor, means for switching the articles from the second conveyor into the path defined by said first conveyor means, a wall which extends along the outer edge of the reversely moving conveyor, said wall having a window therein, means providing a longitudinal guideway at the outer side of said wall, a switch arm carrier slidable in said guideway, and a switch arm mounted on the carrier and extending through the window in the wall.

14. In combination, in apparatus for delivering articles to any one of a series of article-processing units, said apparatus comprising constantly moving conveyor means defining a single undivided rectilinear path of substantially uniform width from which articles are diverted for delivery to said units, means for diverting articles from said path, a conveyor parallel to and moving reversely to said first conveyor means, means for transferring any article, which approaches the terminus of said conveyor path without having been diverted therefrom, to the second conveyor, means for switching articles from the second conveyor into the path defined by said first-named conveyor means, a vertical wall which extends along the outer edge of the reversely moving conveyor, said wall having a window therein, a switch arm of flexible resilient material extending through said window from the outside of said wall, and means carried by the wall so supporting said switch arm that its effective length may be varied.

References Cited in the file of this patent

UNITED STATES PATENTS

| | | |
|---|---|---|
| 1,236,390 | Augensen | Aug. 14, 1917 |
| 1,822,111 | Richardson et al. | Sept. 8, 1931 |
| 2,003,097 | Vickery | May 28, 1935 |
| 2,303,755 | Newton | Dec. 1, 1942 |
| 2,615,555 | Carter | Oct. 28, 1952 |
| 2,620,059 | Niederer | Dec. 2, 1952 |
| 2,642,173 | Wehmiller et al. | June 16, 1953 |
| 2,636,591 | Galper | Apr. 28, 1953 |
| 2,690,251 | Carter | Sept. 28, 1954 |